(12) United States Patent
Posch et al.

(10) Patent No.: US 11,161,558 B2
(45) Date of Patent: Nov. 2, 2021

(54) AIR GUIDE DEVICE FOR A MOTOR VEHICLE BODY OF A MOTOR VEHICLE

(71) Applicant: Dr. Ing. h.c.F. Porsche Aktiengesellschaft, Stuttgart (DE)

(72) Inventors: Tobias Posch, Wimsheim (DE); Joachim Paul, Benningen a. N. (DE); Riccardo Bauer, Owen (DE)

(73) Assignee: DR. ING. H.C. F. PORSCHE AKTIENGESELLSCHAFT, Stuttgart (DE)

(*) Notice: Subject to any disclaimer, the term of this patent is extended or adjusted under 35 U.S.C. 154(b) by 60 days.

(21) Appl. No.: 16/813,880

(22) Filed: Mar. 10, 2020

(65) Prior Publication Data
US 2020/0290688 A1  Sep. 17, 2020

(30) Foreign Application Priority Data
Mar. 12, 2019 (DE) ...................... 10 2019 106 232.2

(51) Int. Cl.
*B62D 35/00* (2006.01)
*B62D 37/02* (2006.01)

(52) U.S. Cl.
CPC .......... *B62D 35/007* (2013.01); *B62D 37/02* (2013.01)

(58) Field of Classification Search
CPC .............................. B62D 35/007; B62D 37/02
See application file for complete search history.

(56) References Cited

U.S. PATENT DOCUMENTS

2002/0041103 A1   4/2002   Hill et al.

FOREIGN PATENT DOCUMENTS

| DE | 102006054986 B4 | * | 9/2009 | ........... B62D 35/007 |
|---|---|---|---|---|
| DE | 102007061257 B4 |  | 12/2009 | |
| DE | 10048122 B4 |  | 2/2010 | |
| DE | 102008039480 A1 |  | 2/2010 | |
| DE | 102015004920 A1 | * | 10/2016 | ............. B62D 35/00 |
| FR | 2791029 A1 | * | 9/2000 | ........... B62D 35/007 |

* cited by examiner

*Primary Examiner* — Lori L Lyjak
(74) *Attorney, Agent, or Firm* — Leydig, Voit & Mayer, Ltd.

(57) ABSTRACT

An air guide device for a motor vehicle body of a motor vehicle. The motor vehicle body has a longitudinal axis, a transverse axis, and a vertical axis. The air guide device includes: an air guide element, which is received in the motor vehicle body so as to be movable with the aid of an adjusting device, and which is movable into at least a first position and a second position. In order to effect a reduced coefficient of air resistance and an increased downforce, the air guide element has a guide element, which is configured to be movable and which is received movably on a wing top surface of the air guide element.

12 Claims, 3 Drawing Sheets

AIR GUIDE DEVICE FOR A MOTOR VEHICLE BODY OF A MOTOR VEHICLE

CROSS-REFERENCE TO PRIOR APPLICATIONS

Priority is claimed to German Patent Application No. DE 10 2019 106 232.2, filed on Mar. 12, 2019, the entire disclosure of which is hereby incorporated by reference herein.

FIELD

The invention relates to an air guide device for a motor vehicle body of a motor vehicle.

BACKGROUND

Air guide devices comprising air guide elements for motor vehicle bodies of motor vehicles are known. The air guide elements are in particular so-called rear wings which are received movably on the motor vehicle body in order that they can, relative to the motor vehicle body, assume different positions between a first end position and a second end position. In the first position, the rear wing is arranged flush with the motor vehicle body, and, in the second end position, the wing is spaced apart from the motor vehicle body to the maximum extent. By means of the rear wing, it is possible in particular for downforce of the motor vehicle that has the motor vehicle body to be varied during operation.

The movable rear wing is connected to an adjusting device of the air guide device. The adjusting device moves the rear wing into its position that is correspondingly to be assumed and holds the rear wing in the position. A disadvantage of the rear wing is the increase of a coefficient of air resistance of the motor vehicle body without rear wing, though this can be reduced through the adjustment of the rear wing. For example, it is not necessary for the rear wing, which serves for effecting adequate downforce, to be deployed at low speeds.

Various possibilities for minimizing the increase of the air resistance, or of the coefficient of air resistance, are known from the prior art.

For example, an air guide device for a motor vehicle body of a motor vehicle is known from the patent DE 10 2007 061 257 B4, which air guide device discloses a rear wing that may be formed as a slotted wing. The air guide device has an air guide element which is designed such that it can be received in a lower shell and, with this, can be lowered completely into the motor vehicle body so as to assume its rest position. The air guide element together with the lower shell forms the rear wing. In an intermediate position, the air guide element, together with and lying in the lower shell, is arranged so as to project out of the motor vehicle body with the aid of an adjusting device. In order that maximum possible downforce can be effected, the air guide element is raised out of the lower shell with the aid of the adjusting device, whereby the slotted wing is formed and the rear wing assumes its effective position.

The patent DE 100 48 122 B4 discloses an air guide device for a motor vehicle body of a motor vehicle, which air guide device is designed to be deployable out of a tailgate of the motor vehicle body.

SUMMARY

An air guide device for a motor vehicle body of a motor vehicle. The motor vehicle body has a longitudinal axis, a transverse axis, and a vertical axis. The air guide device comprises: an air guide element, which is received in the motor vehicle body so as to be movable with the aid of an adjusting device, and which is movable into at least a first position and a second position. In order to effect a reduced coefficient of air resistance and an increased downforce, the air guide element has a guide element, which is configured to be movable and which is received movably on a wing top surface of the air guide element.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
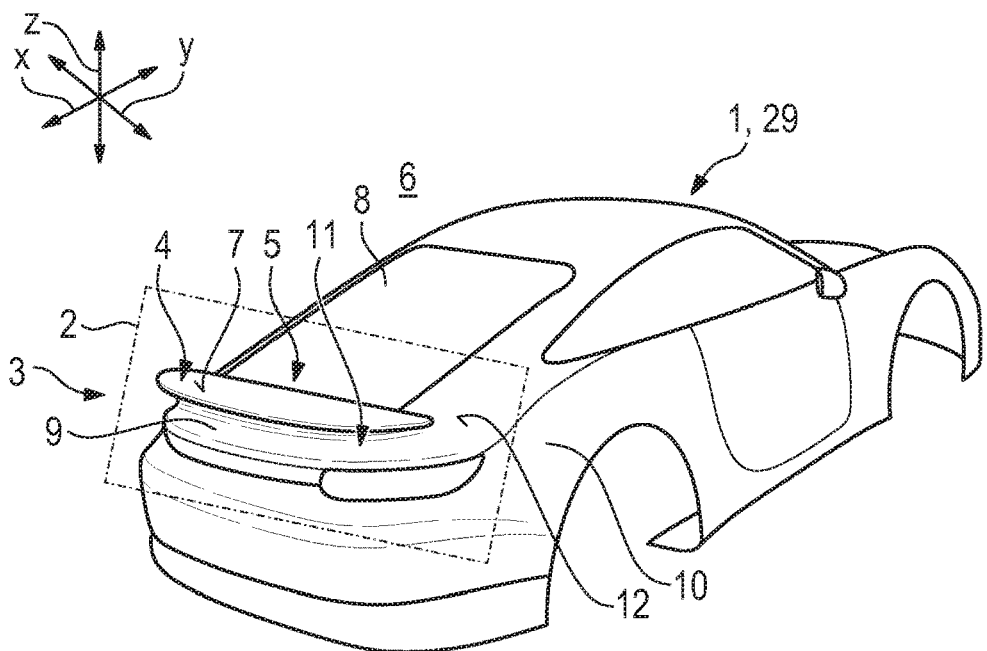
FIG. 1 shows, in a perspective diagrammatic illustration, a motor vehicle body with an air guide device.

Embodiments of the present invention provide an improved air guide device for a motor vehicle body of a motor vehicle realizing a low coefficient of air resistance with simultaneously high downforce.

An air guide device, according to an embodiment of the invention for a motor vehicle body of a motor vehicle, has an air guide element, which is received, so as to be movable with the aid of an adjusting device, in the motor vehicle body, and which is movable into at least a first position and a second position. The motor vehicle body has a longitudinal axis, a transverse axis, and a vertical axis. According to the invention, in order to effect a reduced coefficient of air resistance and the greatest possible downforce, the air guide element has a guide element, which is designed to be movable, and which is received movably on a wing top surface of the air guide element. An advantage is the realization of a further increased multiplicity of flow-guiding positions of the air-guiding element in relation to the prior art, which can lead to a reduction of the coefficient of air resistance, and/or to an increase in downforce, and/or reduction in lift at a multiplicity of operating points of the motor vehicle. The reduction of the coefficient of air resistance, and/or increase in downforce, and/or a reduction in lift leads not only to the realization of a stable situation of the motor vehicle at a multiplicity of speeds and operating points, but also to a possible reduction in fuel consumption of the motor vehicle. A further advantage of the movable guide element can be seen in the fact that it is designed to be deployable, in particular, at a speed of the motor vehicle that is relevant with regard to running resistance, and/or relevant with regard to drive output. This means that the guide element can be used exclusively in the speed ranges in which it is required, because it could possibly give rise to losses in other speed ranges. The guide element can thus be used in an effective and efficient manner.

In one embodiment of the air guide device according to the invention, the guide element is designed to be flowed around in the direction of the longitudinal axis. In other words, this means that the air guide device is designed to influence the air flow in the direction of the longitudinal axis, whereby it is possible in particular for the stability of the motor vehicle in the direction of its longitudinal axis to be influenced during operation.

The air guide element is advantageously of U-shaped form, giving rise to the possibility of forming a so-called slotted wing. This means that, during an adjustment of the inclination of the air guide element relative to the motor vehicle body, the air flow can flow both over the air guide element and between the air guide element and the motor vehicle body. It is thus advantageously possible for an equalization between lift and downforce of the motor vehicle to be effected at different operating points of the motor vehicle.

In a further embodiment, the air guide element is rotatably received on a device element, which is formed so as to be fixed or movable with the motor vehicle body. The advantage of the rotatable design can be seen in simple positioning and movement of the air guide element, because merely the positioning into its effective position can be performed with a single movement.

If the air guide element is designed to lie on the device element or such that it can be lowered into the device element, it is possible in particular at low speeds of the motor vehicle for adverse flow guidance owing to gaps between the components to be avoided. A further advantage is the possibility of leaving the motor vehicle body unchanged in terms of its basic shape, that is to say in other words without the air guide device being visible, that is to say with the air guide element retracted and guide element retracted. In other words, this means that the impression of the basic shape is visible to the observer until at least the air guide element is deployed. The guide element is thus, like the air guide element, integrated into the basic shape and designed to be movable in order to effect a stable situation of the motor vehicle and a reduction of the air resistance of the motor vehicle body when the air guide element is deployed.

In a further embodiment of the air guide device according to the invention, the device element is designed in the form of a rear wing which is rigid or which is formed so as to be movable on the motor vehicle body. Irrespective of whether the rear wing is received rigidly or movably, that is to say so as to be retractable and deployable, on the motor vehicle body, it is possible to realize a so-called slotted wing in the event of adjustment of an inclination of the air guide element relative to the rear wing, whereby stable operation of the motor vehicle can be realized in numerous driving modes. A further advantage is a reduction in fuel consumption of the motor vehicle that has the motor vehicle body, with a simultaneously stable situation at high speeds.

It is particularly advantageous with regard to the aerodynamic action of the air guide device if an active element of the air guide device and/or the guide element are designed in a streamlined manner so as to have an airfoil-like profile.

In a further embodiment of the air guide element, the guide element is received on the air guide element rotatably about a center of rotation for rotation about the transverse axis. The advantage of the rotatable design can, as is also the case with the air guide element, be seen in simple positioning and movement of the air guide element, because merely the positioning into its effective position can be performed with a single movement.

If the air guide element and/or the guide element are of lightweight construction, in particular formed from a carbon composite material, the motor vehicle body can be designed to be of reduced weight overall, and a reduction in consumption and accordingly a reduction in emissions are made possible.

In a further preferred embodiment, the guide element has a bottom surface which is of complementary design with respect to a depression of the air guide element. This prevents a flow under the guide element when the latter is in its position received in the air guide element, which position is assumed in particular in the low load and engine speed range of the motor vehicle. It is thus possible for disadvantageous turbulence and flow separation owing to the flow passing under to be avoided.

In a further embodiment of the air guide device according to the invention, the guide element is designed to be deployable in a maximum position or in an intermediate position of the air guide element. The advantage can be seen in that a multiplicity of positions of the guide element can be set in conjunction with the position of the active element of the air guide device, in order that operating-point-dependent positioning of the air guide device dependent on the operation of the motor vehicle can be set. Accordingly, in at least the predominant number of operating points of the motor vehicle, it is possible to realize an optimized, that is to say best possible coefficient of air resistance and/or downforce.

Further advantages, features and details of the invention will emerge from the following description of preferred exemplary embodiments and from the drawing. The features and feature combinations mentioned above in the description and the features and feature combinations mentioned below in the description of the figures and/or shown in the figures alone are able to be used not only in the respectively specified combination but also in other combinations or individually without departing from the scope of the invention. Identical or functionally identical elements are denoted by identical reference signs.

Figure 2:
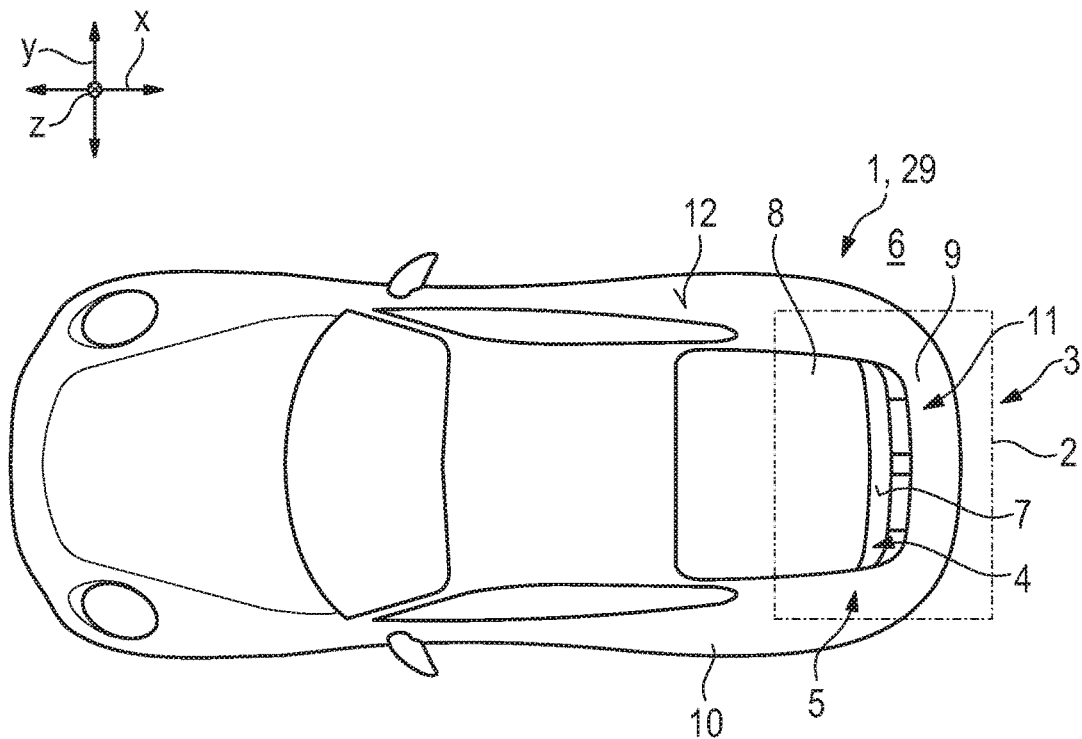
FIG. 2 shows, in a plan view, the motor vehicle body as per FIG. 1.
Figure 3:
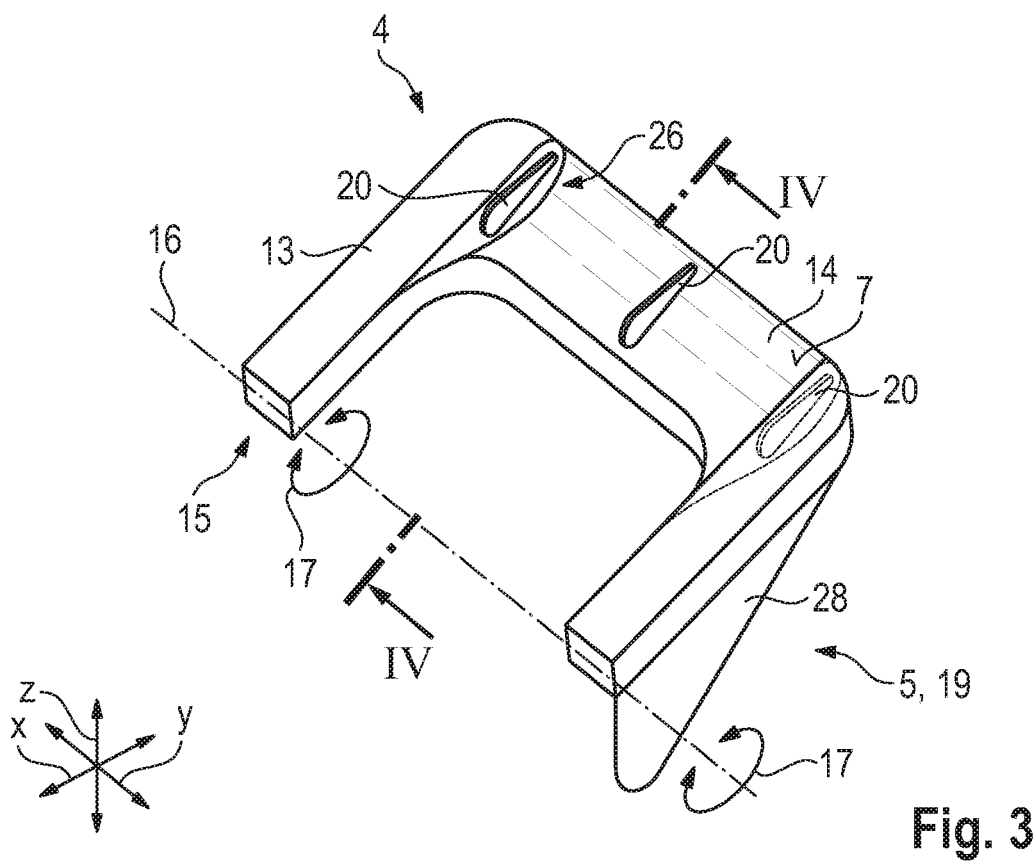
FIG. 3 shows, in a perspective illustration, an air guide device according to the invention in a plan view.

A motor vehicle body 1 designed as per FIGS. 1 and 2 of a motor vehicle 29 includes an air guide device 3 according to the prior art arranged in a rear-end region 2 of the motor vehicle body 1. The air guide device 3 is adjustable from a first operating position into a second operating position. With the aid of the air guide device 3, it is possible in particular for a coefficient of air resistance and a downforce of the motor vehicle body 1 or of the motor vehicle 29 to be varied. The air guide device 3 includes at least one air guide element 4 for flow guidance, which guide element is connected to an adjusting device 5, which is received in the motor vehicle body 1. The air guide element 4 is designed in the form of a rear wing and is referred to hereinafter as a wing. In particular, a wing top surface 7, designed to face toward the surroundings 6, of the wing 4 is of aerodynamic design.

In the rear-end region 2, the motor vehicle body 1 has a rear window 8 and a tailgate 9, which are arranged between side walls 10 of the motor vehicle body 1. The tailgate 9 of the motor vehicle 1 is formed with an opening 11 in which the wing top surface 7, in a first end position, is arranged flush with a body surface 12 of the motor vehicle body 1.

The motor vehicle body 1 has a longitudinal axis x, a transverse axis y and a vertical axis z, as are symbolically illustrated in a Cartesian axis system.

FIGS. 3 to 6 illustrate the air guide device 3 according to the invention in different views and in assembly and interaction with the motor vehicle body 1.

The air guide element 4 is of U-shaped design. Lateral arms 13, which extend predominantly in the direction of the longitudinal axis x, of the air guide elements 4 are designed to support an active element 14 of the air guide element 4. The active element is arranged so as to extend predominantly transversely, in the direction of the transverse axis y, between the two lateral arms 13. This means that the lateral arms 13 are not imperatively required for realizing the aerodynamic action of the air guide element 4, that of effecting adequate downforce, but may contribute to this.

For the purposes of changing the position of the air guide element 4 relative to the motor vehicle body 1, the air guide element is received movably on the motor vehicle body 1. In the present exemplary embodiment, arm ends 15, which are formed so as to be averted from the active element 14, of the lateral arms 13 are mounted on the motor vehicle body 1 so as to be rotatable in the direction of the arrow 17 about an axis of rotation 16 configured in the direction of the transverse axis y.

The air guide element 4 of the air guide device 3 according to the invention could also be received rotatably on a device element 28, fixedly connected to the motor vehicle body 1, of the air guide device 3. The device element 28 is formed so as to be integrated into a vehicle geometry of the motor vehicle body 1. The profile of the device element may already have the shape of a fixed rear spoiler. The air guide device 3 may be received such that it can be lowered into the device element 28 in the direction of the z axis, or may be designed to lie on the device element 28.

In a further exemplary embodiment, the device element 28 may also be designed in the form of an adjustable rear wing. In other words, this means that the air guide element 4 is designed to lie on, or be lowerable into, the adjustable rear wing, which is possibly entirely and/or partially retractable into the motor vehicle body 1. The air guide element 4 can be moved independently of the adjustable rear wing.

A movement of the air guide element 4 is performed with the aid of the adjusting device 5, which has lever arms 18 of a kinematic mechanism 19 of the adjusting device 5, which lever arms are connected to the air guide element 4. Likewise designed to be movable with the aid of the adjusting device 5 are guide elements 20 which are arranged movably on the air guide element 4, on the wing top surface 7 thereof. The guide elements 20 have a center of rotation 21 and are mounted on the air guide element 4 so as to be rotatable about the center of rotation.

The guide elements 20 have an airfoil-like profile, as does the active element 14. Here, the guide elements 20 are arranged with their first profile tip 22 so as to be directed oppositely to the second profile tip 23 of the active element 14. It is thus possible, in an intermediate position formed between the first maximum position and the second maximum position and illustrated in FIGS. 4 and 5, to prevent a flow separation of the streamlines 24 that form along the wing top surface 7.

In the intermediate position, in order to prevent instances of flow separation, the guide elements 20 are configured to be level or approximately level with the wing top surface 7. In other words, this means that a top surface 25 of the guide elements 20, which top surface is oriented in the same direction as the wing top surface 7, is arranged in a plane with the wing top surface 7. The guide element 20 is arranged so as to be received in the active element 14. This means that the active element 14 has, in accordance with the number of guide elements 20, depressions 26 for receiving the guide elements 20, which depressions is of complementary design with respect to a bottom surface 27, formed so as to be averted from the top surface 25, of the guide element 20.

In the second maximum position of the air guide device 3 according to the invention, in which the air guide element 4 is positioned so as to be rotated by a maximum angle γ about the axis of rotation 16 and the guide elements 20 are likewise inclined to a maximum extent relative to the wing surface 7, a so-called slotted wing is thus formed. To effect a preferred level of downforce, the flow can pass over the air guide element 4 and through between the motor vehicle body 1 or the device element 28 and the air guide element 4.

Figure 4:
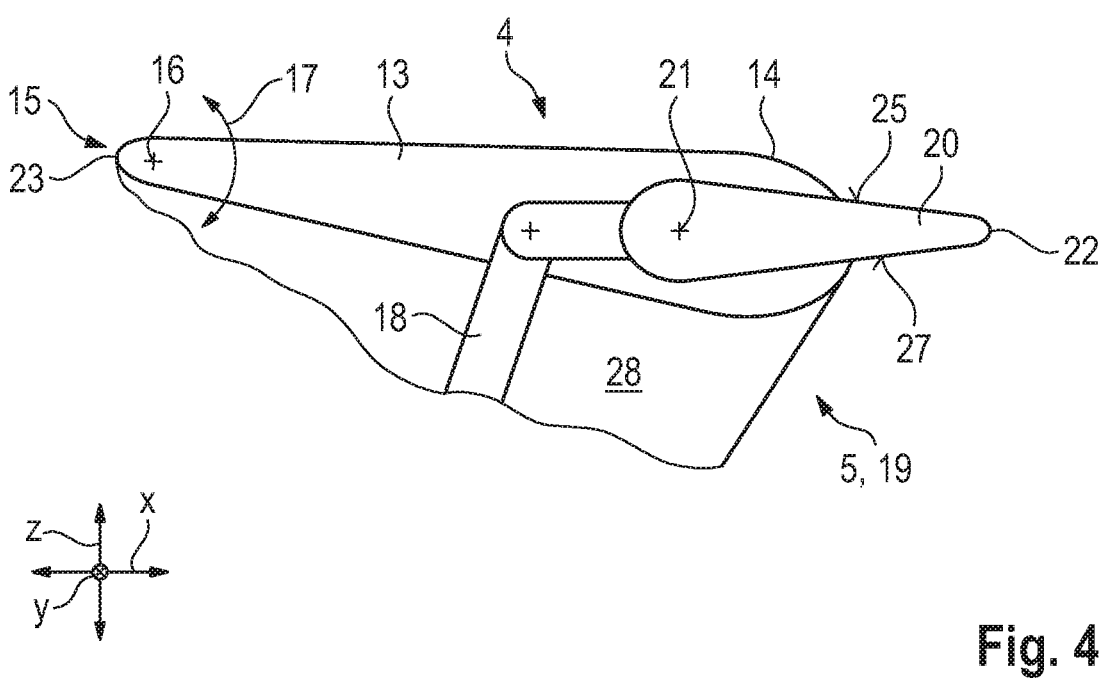
FIG. 4 shows the air guides device according to the invention in a section IV-IV.
Figure 5:
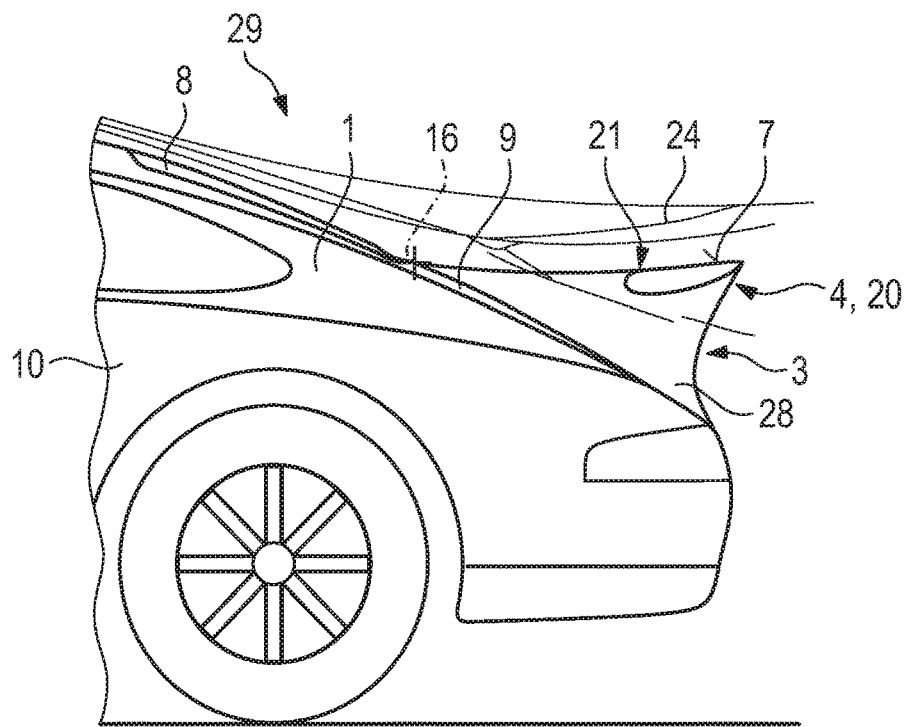
FIG. 5 shows, in a side view, a motor vehicle having the guide device according to the invention for its motor vehicle body in a first maximum position.

The positions of the guide elements 20 and/or the position of the air guide element 4 are numerous. It is accordingly possible, for example, for the guide elements 20, proceeding from their rest position as illustrated in FIGS. 4 and 5, to be adjusted in inclination relative to the air guide element 4 into different positions, while the air guide element 4 itself remains in its rest position as illustrated for example in FIGS. 4 and 5. Likewise, the air guide element 4 can be adjusted in inclination relative to the motor vehicle body 1, whereas the guide elements 20 remain in their rest position relative to the air guide element 4. In other words, this means that numerous position configurations of the air guide device 3 are possible which can allow for different driving modes, in such a way that the lowest possible coefficient of air resistance with a highest possible level of downforce can be effected.

Figure 6:
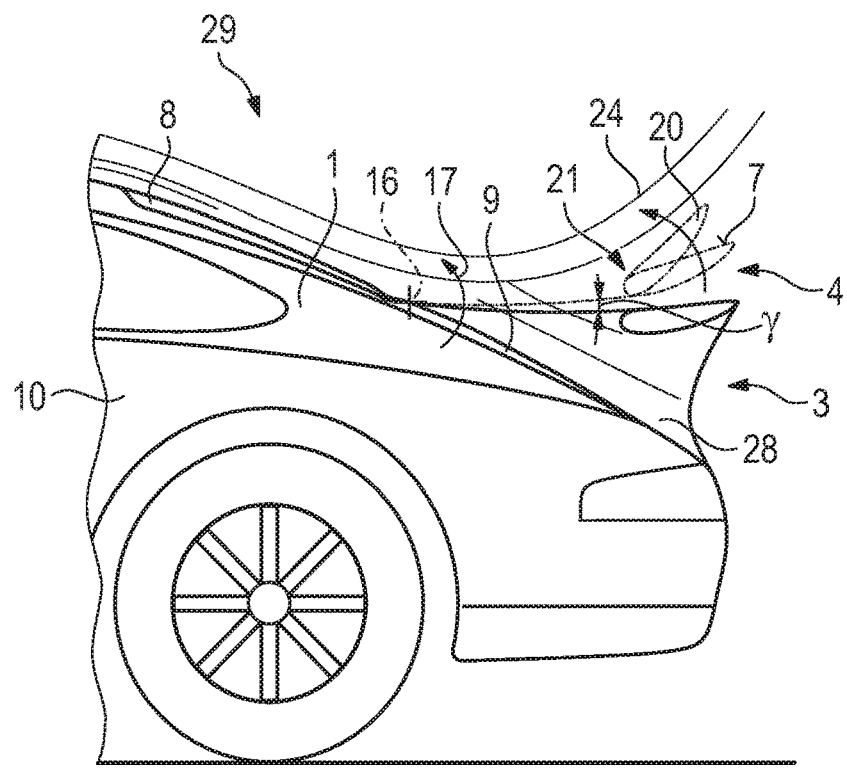
FIG. 6 shows, in a side view, the motor vehicle having the guide device according to the invention in the first maximum position, in a second maximum position and in an intermediate position.

FIG. 6 illustrates the air guide device 3 in different positions. A solid line is used to illustrate the air guide device 3 in its first maximum position, where a dash-dotted line is used to illustrate the air guide device 3 in its second maximum position, which corresponds to a fully angled air guide element 4 and a fully angled guide element 20, and in an intermediate position with fully angled air guide element 4 and only partially angled guide element 20.

To realize further position configurations, it is likewise possible for the guide elements 20 to be differently inclined. In other words, this means that a guide element 20 is inclined to a maximum extent relative to the air guide element 4, while a further guide element 20 is situated in its depression 26.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Motor vehicle body
2 Rear-end region
3 Air guide device
4 Air guide element
5 Adjusting device
6 Surroundings
7 Wing top surface
8 Rear window
9 Tailgate
10 Side wall
11 Opening
12 Body surface
13 Lateral arm
14 Active element
15 Arm end
16 Axis of rotation
17 Arrow
18 Lever arm
19 Kinematic mechanism
20 Guide element
21 Center of rotation
22 First profile tip
23 Second profile tip
24 Streamline
25 Top surface
26 Depression
27 Bottom surface
28 Device element
29 Motor vehicle
x Longitudinal axis
y Transverse axis
z Vertical axis
γ Angle

The invention claimed is:

1. An air guide device for a motor vehicle body of a motor vehicle, wherein the motor vehicle body has a longitudinal axis, a transverse axis, and a vertical axis, the air guide device comprising:
   an air guide element, which is received in the motor vehicle body so as to be movable with the aid of an adjusting device, and which is movable into at least a first position and a second position,
   wherein in order to effect a reduced coefficient of air resistance and an increased downforce, the air guide element has a guide element, which is configured to be movable and which is received movably on a wing top surface of the air guide element.

2. The air guide device as claimed in claim 1, wherein the guide element is configured for being flowed around in the direction of the longitudinal axis.

3. The air guide device as claimed in claim 1, wherein the air guide element is of a U-shaped form.

4. The air guide device as claimed in claim 1, wherein the air guide element is received rotatably on a device element which is formed so as to be fixed or movable with the motor vehicle body.

5. The air guide device as claimed in claim 4, wherein the air guide element is configured: to lie on the device element, or such that it is lowerable into the device element.

6. The air guide device as claimed in claim 5, wherein the device element is a rear wing, which is rigid or which is formed so as to be movable on the motor vehicle body.

7. The air guide device as claimed in claim 1, wherein an active element of the air guide element or the guide element is designed to have an airfoil-like profile.

8. The air guide device as claimed in claim 7, wherein a first profile tip of the guide element is arranged so as to be averted from a second profile tip of the active element.

9. The air guide device as claimed in claim 1, wherein the guide element is received on the air guide element rotatably about a center of rotation for rotation about the transverse axis.

10. The air guide device as claimed in claim 1, wherein the air guide element and the guide element are formed from a carbon composite material.

11. The air guide device as claimed in claim 1, wherein the guide element has a bottom surface which is of a complementary configuration with respect to a depression of the air guide element.

12. The air guide device as claimed in claim 1, wherein the guide element is configured to be deployable in a maximum position or in an intermediate position of the air guide element.

* * * * *